(12) United States Patent
Kusumoto et al.

(10) Patent No.: US 11,208,074 B2
(45) Date of Patent: Dec. 28, 2021

(54) VEHICLE ELECTRONIC KEY SYSTEM

(71) Applicant: DENSO CORPORATION, Kariya (JP)

(72) Inventors: Tetsuya Kusumoto, Nisshin (JP); Kenichiro Sanji, Nisshin (JP); Takashi Shinoda, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/063,915

(22) Filed: Oct. 6, 2020

(65) Prior Publication Data
US 2021/0016743 A1 Jan. 21, 2021

Related U.S. Application Data

(63) Continuation of application No. PCT/JP2019/005331, filed on Feb. 14, 2019.

(30) Foreign Application Priority Data

Apr. 9, 2018 (JP) .............................. JP2018-074743

(51) Int. Cl.
*B60R 25/24* (2013.01)
*G01S 13/76* (2006.01)
*B60R 25/20* (2013.01)

(52) U.S. Cl.
CPC ............ *B60R 25/245* (2013.01); *G01S 13/76* (2013.01); *B60R 25/209* (2013.01); *B60R 2325/205* (2013.01)

(58) Field of Classification Search
CPC ..... B60R 25/245; B60R 25/209; E05B 81/78; G01S 13/765; G01S 13/08

USPC ........................................................ 340/5.61
See application file for complete search history.

(56) References Cited

U.S. PATENT DOCUMENTS

| 2008/0146196 A1 | 6/2008 | Tanaka et al. |
| 2016/0332597 A1 | 11/2016 | Tokunaga et al. |
| 2017/0318423 A1 | 11/2017 | Reisinger et al. |
| 2019/0179004 A1 | 6/2019 | Okada |

FOREIGN PATENT DOCUMENTS

| JP | 2005005902 A | 1/2005 |
| JP | 2015131608 A | 7/2015 |
| JP | 2016038332 A | 3/2016 |
| JP | 2016056523 A | 4/2016 |
| JP | 6093647 B2 | 3/2017 |
| JP | 2018031601 A | 3/2018 |

*Primary Examiner* — Vernal U Brown
(74) *Attorney, Agent, or Firm* — Harness, Dickey & Pierce, P.L.C.

(57) ABSTRACT

A vehicle electronic key system includes a plurality of in-vehicle communication devices and an authentication device. Each of the plurality of in-vehicle communication devices communicates wirelessly with another in-vehicle communication device, and based on a signal transmitted from the another in-vehicle communication device, generate distance-related information that directly or indirectly indicates a distance to the another in-vehicle communication device. The authentication device specify a plurality of inter-communication device distances based on the distance-related information generated by the plurality of in-vehicle communication devices, and does not execute a vehicle control when at least one of the plurality of inter-communication device distances deviates from a predetermined normal range.

9 Claims, 8 Drawing Sheets

| COMBINATION OF COMMUNICATION DEVICES | NORMAL RANGE |
|---|---|
| RIGHT COMMUNICATION DEVICE, LEFT COMMUNICATION DEVICE | 0.5m TO 4m |
| VEHICLE INTERIOR COMMUNICATION DEVICE, RIGHT COMMUNICATION DEVICE | 0.3m TO 3m |
| VEHICLE INTERIOR COMMUNICATION DEVICE, LEFT COMMUNICATION DEVICE | 0.3m TO 3m |

…

VEHICLE ELECTRONIC KEY SYSTEM

CROSS REFERENCE TO RELATED APPLICATIONS

The present application is a continuation application of International Patent Application No. PCT/JP2019/005331 filed on Feb. 14, 2019, which designated the U.S. and claims the benefit of priority from Japanese Patent Application No. 2018-074743 filed on Apr. 9, 2018. The entire disclosures of all of the above applications are incorporated herein by reference.

TECHNICAL FIELD

The present disclosure relates to a vehicle electronic key system.

BACKGROUND

Conventionally, there have been proposed various vehicle electronic key systems in which an in-vehicle system mounted on a vehicle executes an authentication process by wireless communication with a portable device carried by a user, and executes vehicle control such as locking and unlocking doors based on a success of the authentication process

SUMMARY

The present disclosure provides a vehicle electronic key system including a plurality of in-vehicle communication devices and an authentication device. Each of the plurality of in-vehicle communication devices communicates wirelessly with another in-vehicle communication device, and based on a signal transmitted from the another in-vehicle communication device, generate distance-related information that directly or indirectly indicates a distance to the another in-vehicle communication device. The authentication device specify a plurality of inter-communication device distances based on the distance-related information generated by the plurality of in-vehicle communication devices, and does not execute a vehicle control when at least one of the plurality of inter-communication device distances deviates from a predetermined normal range.

BRIEF DESCRIPTION OF DRAWINGS

Objects, features and advantages of the present disclosure will become apparent from the following detailed description made with reference to the accompanying drawings. In the drawings.

DETAILED DESCRIPTION

Figure 1:
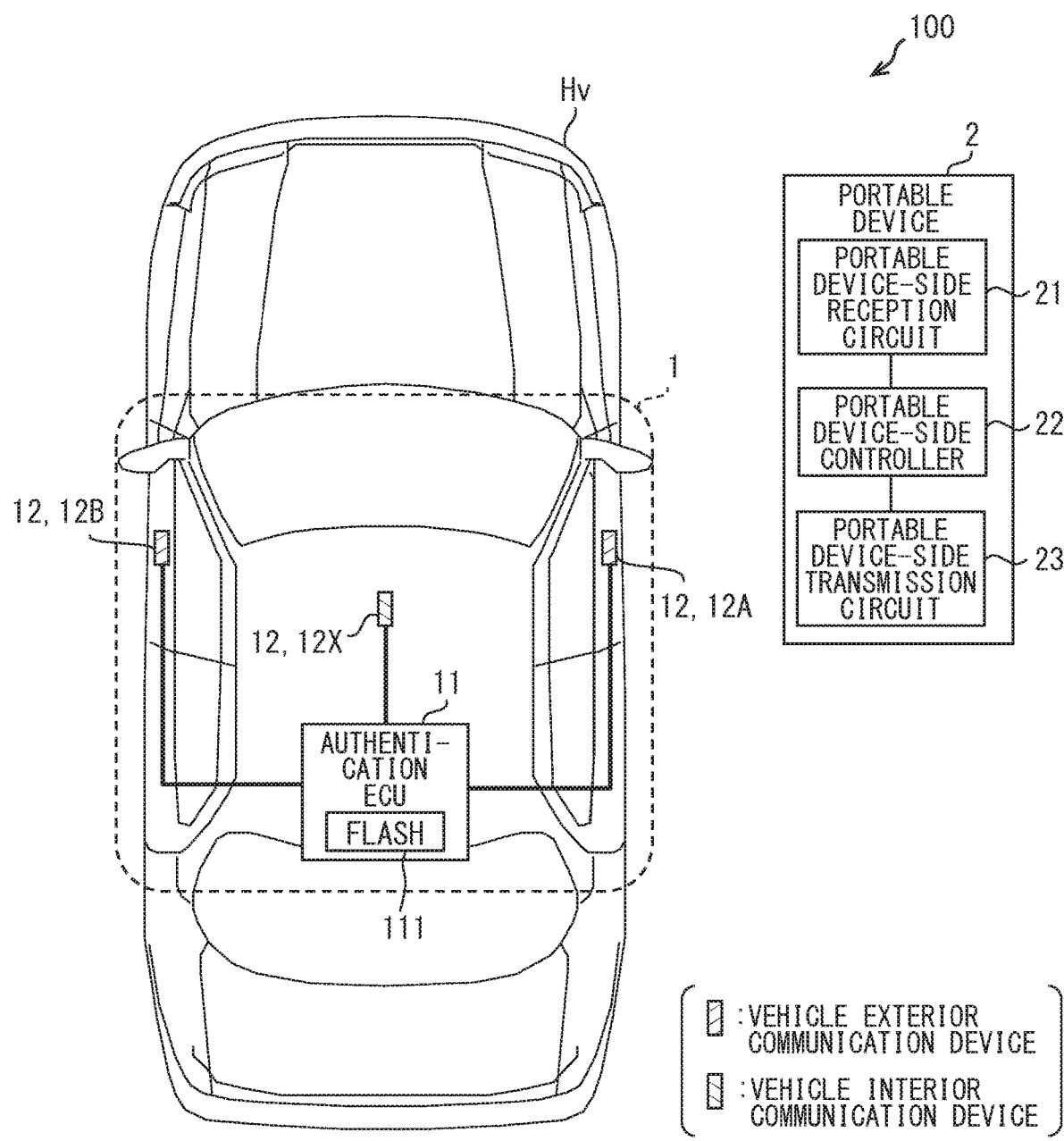
FIG. 1 is a diagram showing a schematic configuration of a vehicle electronic key system.

Generally, an in-vehicle system that provides a vehicle electronic key system includes a plurality of communication devices (hereinafter referred to as vehicle exterior communication devices) for performing wireless communication with a portable device present outside the vehicle. The vehicle exterior communication device can be installed at a position appropriately selected on an outer surface of the vehicle, such as a door handle arranged on an outer surface of a driver's door or a door handle arranged on an outer surface of a passenger door. Then, the in-vehicle system performs wireless communication with the portable device present outside the vehicle by using the vehicle exterior communication device, thereby detecting that the portable device is present in the vicinity of the vehicle or performing the authentication process.

In a certain vehicle electronic key system, an in-vehicle system and a portable device are configured to be capable of performing ultra-wide band (UWB) communication, and the in-vehicle system may estimate a distance of the portable device with respect to the vehicle based on a time from transmission of an impulse signal used in UWB communication to reception of a response signal from the portable device (hereinafter referred to as a round trip time). Then, the in-vehicle system executes vehicle control such as locking and unlocking of the vehicle doors under conditions that the authentication process with the portable device is successful and the distance to the portable device is equal to or less than a predetermined threshold value. A device for the in-vehicle system to perform UWB communication (hereinafter referred to as a UWB communication device) is arranged near the driver's seat or the passenger seat in the vehicle interior.

In the vehicle electronic key system, there is concern about a relay attack in which a third party illegally establishes the authentication of the portable device by transmitting a wireless signal from the vehicle exterior communication device to a distance using a relay device, and indirectly realizing wireless communication between the in-vehicle system and the portable device. If the relay attack succeeds, the vehicle control such as unlocking the vehicle doors or starting an engine is executed even though an authorized user does not intend to execute the vehicle control.

As one configuration for preventing the relay attack, it is conceivable that the vehicle exterior communication device calculates the distance to the portable device using, for example, predetermined distance index information, and the vehicle control is executed on a condition that the distance from the portable device to the vehicle exterior communication device is within a predetermined normal range. The distance index information is information serving as an index of the distance from the vehicle to the portable device, and includes, for example, a round trip time and a signal reception intensity. The vehicle exterior communication device detects the distance index information such as the round trip time. The calculation of the distance based on the distance index information may be performed by the vehicle exterior communication device or an ECU.

Since the vehicle exterior communication device is disposed on the outer surface portion of the vehicle, it is not impossible to remove the vehicle exterior communication device from the vehicle body by using a predetermined tool. Then, when the vehicle exterior communication device removed from the vehicle body (hereinafter referred to as a vehicle leaving device) is arranged near the user and a baseband signal from the vehicle to the vehicle exterior communication device is relayed to the vehicle leaving device, it is recognized that the portable device is present near the vehicle exterior communication device. This is because the vehicle leaving device is present near the portable device, and thus the round trip time or the like as the distance index information takes a value indicating that the portable device is present nearby.

Then, the above-described configuration cannot deal with the case where the vehicle exterior communication device is removed from the vehicle and the baseband signal is relayed.

A vehicle electronic key system according to an aspect of the present disclosure is configured to execute an authentication process by wireless communication with a portable device carried by a user of a vehicle and to execute a predetermined vehicle control based on a success of the authentication process, and the vehicle electronic key system includes a plurality of in-vehicle communication devices configured to be disposed on different positions of the vehicle as communication devices that perform wireless communication with the portable device and an authentication device configured to be communicably connected to each of the plurality of in-vehicle communication devices. At least one of the plurality of in-vehicle communication devices is configured to be disposed on an outer surface of the vehicle, and each of the plurality of in-vehicle communication devices is configured to perform wireless communication with at least another in-vehicle communication device among the plurality of in-vehicle communication devices and configured to generate, based on a signal transmitted from the another in-vehicle communication device, distance-related information that directly or indirectly indicates a distance to the another in-vehicle communication device. The authentication device includes a control execution unit configured to execute the vehicle control based on the success of the authentication process, and an inter-communication device distance specifying unit configured to specify, based on the distance-related information respectively generated by the plurality of in-vehicle communication devices, a plurality of inter-communication device distances, which are distance between two in-vehicle communication devices, for respective combinations of the in-vehicle communication devices in a positional relationship capable of performing wireless communication with each other. The control execution unit is further configured not to execute the vehicle control when at least one of the plurality of inter-communication device distances for the respective combinations of the in-vehicle communication devices deviates from a predetermined normal range according to the respective combinations of the in-vehicle communication devices.

A vehicle electronic key system according to another aspect of the present disclosure includes a plurality of in-vehicle communication devices configured to be disposed on different positions of a vehicle and to perform wireless communication with a portable device carried by a user of the vehicle, and an authentication device configured to be communicably connected to each of the plurality of in-vehicle communication devices. At least one of the plurality of in-vehicle communication devices is configured to be disposed on an outer surface of the vehicle. Each of the plurality of in-vehicle communication devices is configured to perform wireless communication with at least another in-vehicle communication device among the plurality of in-vehicle communication devices and configured to generate, based on a signal transmitted from the another in-vehicle communication device, distance-related information that directly or indirectly indicates a distance to the another in-vehicle communication device. The authentication device includes a processor and a memory that stores instructions configured to, when executed by the processor, cause the processor to: execute an authentication process of the portable device; specify, based on the distance-related information respectively generated by the plurality of in-vehicle communication devices, a plurality of inter-communication device distances, which are distance between two in-vehicle communication devices, for respective combinations of the in-vehicle communication devices in a positional relationship capable of performing wireless communication with each other; execute a predetermined vehicle control when all of the inter-communication device distances for the respective combinations of the in-vehicle communication devices are within predetermined normal ranges according to the respective combinations of the in-vehicle communication devices and the authentication process of the portable device is successful; and not execute the vehicle control when at least one of the inter-communication device distances for the respective combinations of the in-vehicle communication devices deviates from the normal range.

When the in-vehicle communication device mounted on the vehicle is removed from the vehicle, the distance from the in-vehicle communication device to the other in-vehicle communication device becomes long. Therefore, when the in-vehicle communication device is removed from the vehicle, the inter-communication device distance, which is the distance between the in-vehicle communication devices, may take a value that deviates from the normal range set in advance (in other words, an improper value). This is because the normal range is set on the assumption that each of the in-vehicle communication devices is mounted on the vehicle.

The authentication device does not execute the vehicle control when at least one of the inter-communication device distances for the respective combinations of the in-vehicle communication devices deviates from the predetermined normal range according to the respective combinations of the in-vehicle communication devices. According to such a configuration, even when the in-vehicle communication device arranged on the outer surface portion of the vehicle is removed from the vehicle together with a communication module and a relay at the baseband signal level is performed, illegal use of the vehicle can be restricted.

Embodiments of the present disclosure will be described below with reference to the drawings. FIG. 1 is a diagram showing an example of a schematic configuration of a vehicle electronic key system 100 of the present embodiment. As shown in FIG. 1, the vehicle electronic key system 100 includes an in-vehicle system 1 mounted on a vehicle Hv, and a portable device 2 which is a communication terminal carried by a user of the vehicle Hv.

The in-vehicle system 1 and the portable device 2 have a configuration for bidirectionally performing wireless communication using radio waves in a predetermined frequency band. In the present embodiment, the in-vehicle system 1 and the portable device 2 are configured to be capable of performing wireless communication of the Ultra Wide Band-Impulse Radio (UWB-IR) system as an example. That is, the in-vehicle system 1 and the portable device 2 are configured to be capable of transmitting and receiving impulse-shaped radio waves (hereinafter referred to as impulse signals) used in UWB communication. The impulse signals used in the UWB communication are signals having extremely short pulse widths (for example, 2 ns) and bandwidths of 500 MHz or more (that is, ultra-wide bandwidths).

Examples of frequency bands which can be used for the UWB communication (hereinafter referred to as UWB bands) include 3.1 GHz to 10.6 GHz, 3.4 GHz to 4.8 GHz, 7.25 GHz to 10.6 GHz, and 22 GHz to 29 GHz. Among these various frequency bands, the UWB band in the present embodiment indicates the band of 3.1 GHz to 10.6 GHz as an example. That is, the impulse signals in the present embodiment are implemented using radio waves in the band of 3.1 GHz to 10.6 GHz. It is only required that the bandwidths of the impulse signals are 500 MHz or more, and the impulse signals may have bandwidths of 1.5 GHz or more.

As a modulation method for the UWB-IR communication, various methods such as a pulse position modulation (PPM) method for modulating at a pulse generation position can be adopted. Specifically, an on-off modulation (OOK) system, a pulse width modulation (PWM) system, a pulse amplitude modulation (PAM) system, a pulse code modulation (PCM), and the like can be adopted. The on-off modulation method is a method of expressing information (for example, 0 and 1) by the presence or absence of an impulse signal, and the pulse width modulation method is a method of expressing information by a pulse width. The pulse amplitude modulation method is a method of expressing information by the amplitude of an impulse signal. The pulse code modulation method is a method of expressing information by combining pulses.

The portable device 2 is configured to return an impulse signal as a response signal when receiving an impulse signal from the in-vehicle system 1. The in-vehicle system 1 authenticates the portable device 2 by wirelessly communicating with the portable device 2. Moreover, the in-vehicle system 1 performs a predetermined vehicle control for the user to use the vehicle Hv based on the success of the authentication of the portable device 2. The vehicle control for the user to use the vehicle Hv includes opening and locking of vehicle doors, starting of an engine, and the like.

The process of authenticating the portable device 2 by the in-vehicle system 1 is a process of confirming that a communication terminal (hereinafter referred to as a communication target) that is performing wireless communication with the in-vehicle system 1 is an authorized portable device 2 associated with the in-vehicle system 1. The fact that the authentication is successful corresponds to a determination that the communication terminal is the authorized portable device 2.

The authentication of the portable device 2 by the in-vehicle system 1 may be performed by a challenge response method. The details of the authentication process will be described later. In preparation for the authentication process, a common encryption key used for the authentication process is stored in each of the portable device 2 and the in-vehicle system 1. In addition, a unique identification number (hereinafter referred to as a portable device ID) is assigned to the portable device 2, and the portable device ID is registered in the in-vehicle system 1. The above-described encryption key may be the portable device ID. The in-vehicle system 1 is also assigned a unique identification number (hereinafter referred to as a vehicle ID) and the vehicle ID is registered in the portable device 2. Hereinafter, specific configurations of the in-vehicle system 1 and the portable device 2 will be described in order.

First, the configuration and the operation of the portable device 2 will be described. The portable device 2 can be implemented using a communication terminal which is applied to various purposes. As shown in FIG. 1, the portable device 2 includes a portable device-side reception circuit 21, a portable device-side controller 22, and a portable device-side transmission circuit 23. The portable device-side controller 22 is communicably connected to each of the portable device-side reception circuit 21 and the portable device-side transmission circuit 23.

The portable device-side reception circuit 21 is a configuration for receiving impulse signals in the UWB band. Upon receiving an impulse signal, the portable device-side reception circuit 21 generates a reception signal while electrically processing the impulse signal such as demodulating the impulse signal and outputs the reception signal to the portable device-side controller 22. The portable device-side reception circuit 21 corresponds to a configuration for receiving a signal from the in-vehicle system 1.

When the reception signal is input from the portable device-side reception circuit 21, the portable device-side controller 22 generates a baseband signal corresponding to a response signal corresponding to the reception signal, and outputs the baseband signal to the portable device-side transmission circuit 23. For example, when the portable device-side controller 22 receives a challenge signal, which will be described later, transmitted from the in-vehicle system 1, the portable device-side controller 22 generates a baseband signal that includes a response code generated using the encryption key registered in advance in the portable device 2. The baseband signal including the response code generated by the portable device-side controller 22 is output to the portable device-side transmission circuit 23, and is transmitted as a radio signal. In addition, when the portable device-side reception circuit 21 receives a polling signal, which will be described later, transmitted from the in-vehicle system 1, the portable device-side controller 22 generates a predetermined response signal and cooperates with the portable device-side transmission circuit 23 to transmit the response signal.

The portable device-side controller 22 may be implemented using a computer provided with a central processing unit (CPU), a random access memory (RAM), and a read-only memory (ROM). The portable device-side controller 22 may be implemented using one or more integrated circuits (ICs). In addition, the portable device-side controller 22 may be implemented using a microprocessor unit (MPU) or graphical processing unit (GPU). As will be described later, the portable device-side transmission circuit 23 is configured to convert the baseband signal into an impulse signal and transmit the impulse signal. Therefore, the portable device-side controller 22 corresponds to a configuration that causes the portable device-side transmission circuit 23 to transmit an impulse signal as a response signal when the portable device-side reception circuit 21 receives an impulse signal.

The portable device-side transmission circuit 23 generates a response signal while electrically processing, such as modulating, the baseband signal input from the portable device-side controller 22, and transmits the response signal by the UWB communication. The portable device-side transmission circuit 23 is a configuration for transmitting signals to the in-vehicle system 1. Note that it takes a predetermined time (hereinafter referred to as a response processing time) from the reception of the impulse signal from the in-vehicle system 1 to the transmission of the impulse signal as the response signal by the portable device 2. The response processing time is determined in accordance with a hardware configuration of the portable device 2. An expected value of the response processing time can be specified in advance by a test or the like.

Next, the configuration of the in-vehicle system 1 will be described. As shown in FIG. 1, the in-vehicle system 1 includes an authentication ECU 11 and a plurality of in-vehicle communication devices 12. The authentication ECU 11 is an electronic control unit (ECU) that executes various processes such as a mode control process and a vehicle control-related process described later. The authentication ECU 11 corresponds to an authentication device. The authentication ECU 11 is configured as a computer including a CPU, a RAM, a flash memory 111, an I/O, and a bus line connecting these components. The authentication ECU 11 may be implemented using a GPU or MPU instead of the CPU. Further, the authentication ECU 110 may be implemented by a combination of a CPU, a GPU, and an MPU.

The flash memory 111 is a non-volatile and rewritable memory. The flash memory 111 stores a program (hereinafter referred to as a vehicle control program) for causing the computer to function as the authentication ECU 11, and the like. As a concrete storage medium for storing the vehicle control program, various non-transitional substantive storage medium can be adopted. The execution of the vehicle control program by the CPU corresponds to the execution of the method corresponding to the vehicle control program.

Figure 2:
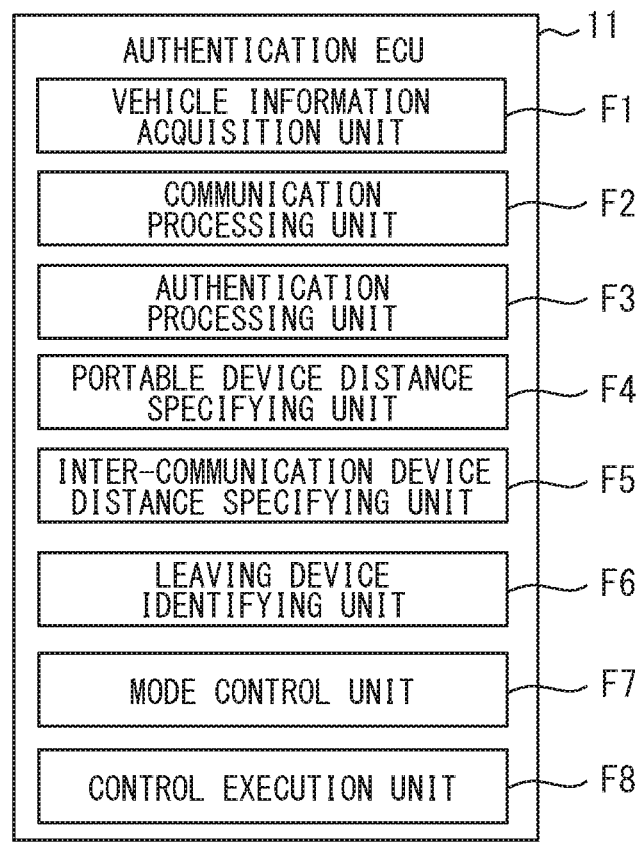
FIG. 2 is a functional block diagram of an authentication ECU.

As shown in FIG. 2, the authentication ECU 11 has a vehicle information acquisition unit F1, a communication processing unit F2, an authentication processing unit F3, a portable device distance specifying unit F4, an inter-communication device distance specifying unit F5, a leaving device identifying unit F6, a mode control unit F7, and a control execution unit F8 as functional blocks realized by the CPU executing the vehicle control program stored in the flash memory 111. Note that some or all of the various functional blocks included in the authentication ECU 11 may be implemented as hardware. An aspect in which a certain function is implemented as hardware also includes an aspect in which the certain function is implemented using one or more ICs. Further, some or all of the various functional blocks may be implemented by cooperation of the execution of software by the CPU or the like and the hardware configuration.

The vehicle information acquisition unit F1 acquires various information (hereinafter referred to as vehicle information) indicating a state of the vehicle Hv from sensors, switches, and the like mounted on the vehicle Hv. The vehicle information includes, for example, an open or closed state of the doors, a locked or unlocked state of each of the doors, a shift position detected by a shift position sensor, a power state of the vehicle Hv (for example, on or off of an ignition power source), an operation state of a parking brake. The types of information included in the vehicle information are not limited to those described above. The vehicle information also includes a detection result of a brake sensor that detects whether or not a brake pedal (not shown) is depressed.

The vehicle information acquisition unit F1 identifies a current state of the vehicle Hv based on the various information described above. For example, when the engine is off and all the doors are locked, the vehicle information acquisition unit F1 determines that the vehicle Hv is parked. It is needless to say that the condition for determining that the vehicle Hv is parked may be designed as appropriate, and various determination conditions can be applied. Details of the communication processing unit F2, the authentication processing unit F3, the portable device distance specifying unit F4, the inter-communication device distance specifying unit F5, the leaving device identifying unit F6, the mode control unit F7, and the control execution unit F8 will be described later separately.

The authentication ECU 11 is communicably connected to each of the plurality of in-vehicle communication devices 12, for example, via a dedicated signal line. The authentication ECU 11 may be communicatively connected to each of the plurality of in-vehicle communication devices 12 via a communication network built in the vehicle.

The authentication ECU 11 is also communicably connected to a body ECU and an engine ECU (not shown) via a communication network. The body ECU is an ECU that executes various processes related to vehicle body control. For example, the body ECU drives a door lock motor provided on each of the doors based on an instruction from the authentication ECU 11 to lock or unlock each of the doors. The engine ECU is an ECU for controlling the operation of an engine mounted on the vehicle Hv. For example, when the engine ECU acquires a start instruction signal that instructs starting of the engine from the authentication ECU 11, the engine ECU starts the engine. As an example, the vehicle Hv is a vehicle provided with an engine as a power source, but the present disclosure is not limited to the above example. The vehicle Hv may be a so-called hybrid vehicle including an engine and a motor as a power source, or an electric vehicle including only a motor as a power source.

The authentication ECU 11 of the present embodiment has two types of operation modes, that is, a normal mode and a warning mode.

The normal mode is an operation mode in which predetermined vehicle control is performed based on the successful authentication of the portable device 2. The warning mode is an operation mode in which the execution of the authentication process by wireless communication is canceled (that is, the authentication process is not executed). Note that, as another aspect, the warning mode may be an operation mode in which vehicle control is not executed even when the authentication of the portable device 2 is successful. The conditions for shifting from the normal mode to the warning mode and the conditions for shifting from the warning mode to the normal mode will be described later separately.

The in-vehicle communication devices 12 are communication devices for performing wireless communication (here, the UWB communication) with the portable device 2. Further, each of the plurality of in-vehicle communication devices 12 is configured to be capable of performing the UWB communication with another in-vehicle communication device 12 mounted on the vehicle Hv. That is, each in-vehicle communication device 12 is configured to be capable of performing mutual communication with the portable device 2 and the another in-vehicle communication device 12. For the sake of convenience, the another in-vehicle communication device 12 for a certain in-vehicle communication device 12 is also referred to as another device.

The in-vehicle system 1 may include at least two in-vehicle communication devices 12. At least one of the plurality of in-vehicle communication devices 12 is arranged on an outer surface portion of the vehicle Hv. In the present disclosure, the outer surface portion is a body portion which is in contact with a vehicle exterior space of the vehicle Hv, and includes a side surface, a rear surface, and a front surface of the vehicle Hv.

The in-vehicle system 1 of the present embodiment includes, as the in-vehicle communication devices 12, a right communication device 12A, a left communication device 12B, and a vehicle interior communication device 12X. The right communication device 12A is an in-vehicle communication device 12 mainly for forming a communication area on the right side of the vehicle. The right communication device 12A is provided, for example, near an outer door handle disposed on a front seat door on the right side of the vehicle. The outer door handle indicates a gripping member (so-called door handle) provided on the outer surface of the door for opening and closing the door. The inside of the outer door handle is also included near the outer door handle.

The left communication device 12B is an in-vehicle communication device 12 mainly for forming a communication area on the left side of the vehicle. The left communication device 12B is provided on an outer door handle disposed on a front seat door on the left side of the vehicle. Hereinafter, the in-vehicle communication devices 12 arranged on the outer surface portion of the vehicle Hv, such as the right communication device 12A and the left communication device 12B, are also referred to as vehicle exterior communication devices.

The vehicle interior communication device 12X is an in-vehicle communication device 12 mainly for forming a communication area in the entire vehicle interior. The vehicle interior communication device 12X is arranged at a position where wireless communication is possible with the in-vehicle communication device 12 such as the right communication device 12A and the left communication device 12B, which are arranged on the outer surface portion of the vehicle Hv. For example, the vehicle interior communication device 12X is arranged in a central portion of a ceiling in the vehicle interior.

The vehicle interior communication device 12X may be arranged on an indoor surface of a B pillar. The vehicle interior communication device 12X may be provided at a central portion in a vehicle width direction of an instrument panel or in the vicinity of a center console box. Although only one vehicle interior communication device 12X is illustrated, a plurality of vehicle interior communication devices 12X may be provided in the vehicle interior. The vehicle interior communication device 12X is preferably arranged at a position where the outside of the vehicle interior can be seen so that the radio signal propagates not only the vehicle interior but also the vehicle exterior. In a case where the body of the vehicle Hv is made of resin having a low radio wave blocking property, the vehicle interior communication device 12X can be arranged at any position in the vehicle interior.

The installation mode (specifically, the installation position and the number of installations) of the in-vehicle communication devices 12 is not limited to the above-described mode. For example, the vehicle exterior communication device may be disposed on the outer surface of the B pillar of the vehicle Hv. Of course the vehicle exterior communication device may be disposed on the outer surface of the A pillar or the C pillar. Furthermore, the vehicle exterior communication device may be disposed near a boundary between the side surface of the vehicle Hv and a roof portion (hereinafter referred to as a side surface upper end portion). Such a configuration corresponds to a configuration in which the vehicle exterior communication device is provided in a portion located above a side window. The side surface upper end portion corresponds to a portion of the roof portion of the vehicle Hv which comes in contact with an upper end of the door of the vehicle Hv. The in-vehicle system 1 may include an in-vehicle communication device 12 having a communication area inside the trunk, and an in-vehicle communication device 12 disposed at a rear end portion of the vehicle such as a rear bumper.

Each of the in-vehicle communication devices 12 is assigned with a unique communication device number. The communication device number functions as information for identifying the in-vehicle communication devices 12. Further, the operation of each of the in-vehicle communication devices 12 is controlled by the authentication ECU 11.

Figure 3:
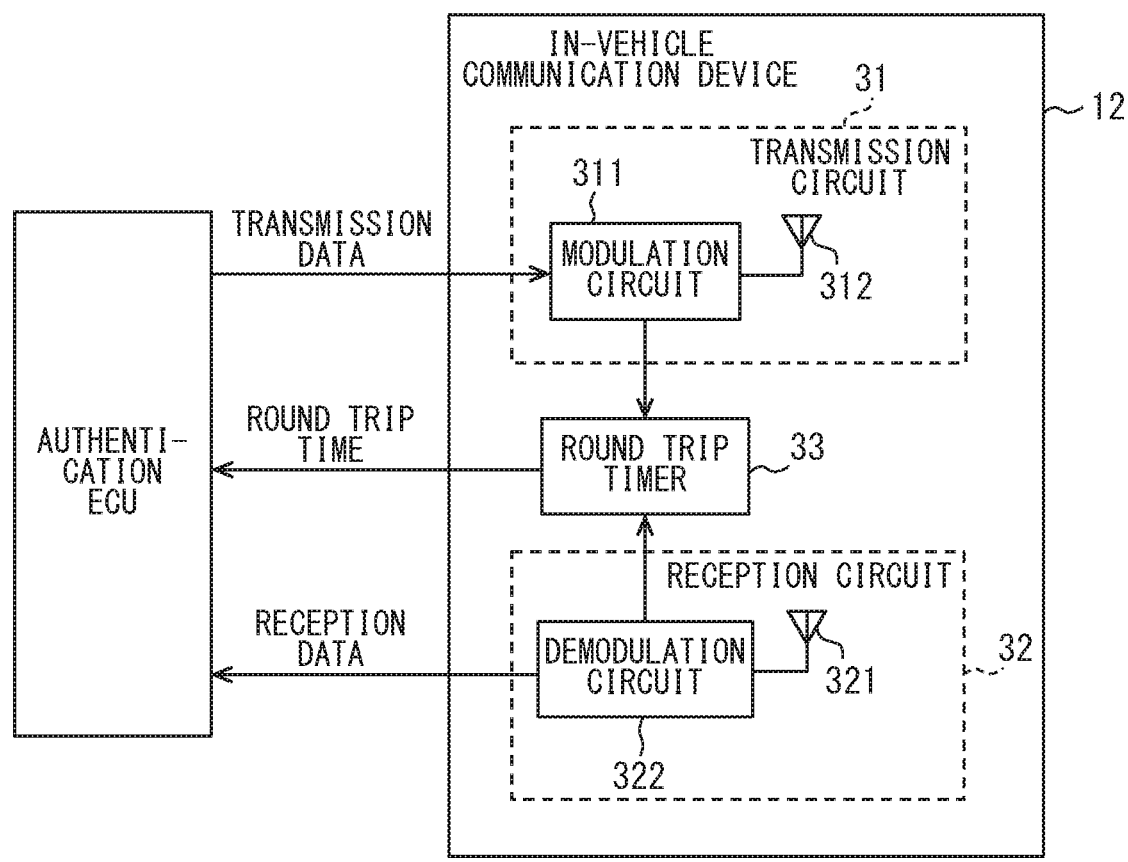
FIG. 3 is a block diagram showing a configuration of an in-vehicle communication device.

As shown in FIG. 3, each of the plurality of in-vehicle communication devices 12 includes a transmission circuit 31, a reception circuit 32, and a round trip timer 33. The transmission circuit 31 is configured to generate an impulse signal while electrically processing, such as modulating the baseband signal input from the authentication ECU 11, and radiate the impulse signal as a radio wave. The transmission circuit 31 is implemented using, for example, a modulation circuit 311 and a transmission antenna 312.

The modulation circuit 311 is a circuit that modulates the baseband signal input from the authentication ECU 11. The modulation circuit 311 generates a modulation signal corresponding to the data (hereinafter referred to as a transmission data) indicated by the baseband signal input from the authentication ECU 11, and transmits the modulations signal to the transmission antenna 312. The modulation signal is a signal obtained by modulating transmission data by a predetermined modulation method (for example, PCM modulation method). The modulated signal means a signal sequence in which a plurality of impulse signals are arranged at time intervals corresponding to the transmission data.

The modulation circuit 311 includes a circuit that generates an electric impulse signal (hereinafter referred to as a pulse generation circuit) and a circuit that amplifies or shapes the impulse signal. The transmission antenna 312 is configured to convert the electric impulse signal output from the modulation circuit 311 into a radio wave and radiate the radio wave into space. That is, the transmission antenna 312 radiates a pulse-like radio wave having a predetermined bandwidth in the UWB band as an impulse signal. Further, when the modulation circuit 311 outputs the electric impulse signal to the transmission antenna 312, at the same time, the modulation circuit 311 outputs a signal indicating that the impulse signal is output (hereinafter referred to as a transmission notification signal) to the round trip timer 33.

The transmission circuit 31 of the present embodiment is configured so that a rise time of the impulse signal is 1 ns. The rise times the time required for a signal intensity to exceed 90% of the maximum amplitude after the signal intensity exceeds 10% of the maximum amplitude for the first time. The rise time of the impulse signal is determined according to the hardware configuration such as the circuit configuration of the transmission circuit 31. The rise time of the impulse signal can be specified by a simulation or a real test. In general, the rise time of the impulse signal in the UWB band is about 1 ns.

The reception circuit 32 is configured to receive a wireless signal conforming to the communication standard adopted in the vehicle electronic key system 100, such as an impulse signal as a response signal transmitted from the portable device 2. The reception circuit 32 includes, for example, a reception antenna 321 and a demodulation circuit 322. The reception antenna 321 is an antenna for receiving an impulse signal. The reception antenna 321 outputs an electric impulse signal corresponding to the impulse signal transmitted by the portable device 2 to the demodulation circuit 322.

When the reception antenna 321 receives the impulse signal in the UWB band, the demodulation circuit 322 generates a reception signal while electrically processing, such as demodulating the impulse signal, and outputs the reception signal to the authentication ECU 11. That is, the demodulation circuit 322 is configured to demodulate a series of modulated signals (hereinafter referred to as pulse sequence signals) composed of a plurality of impulse signals transmitted from the portable device 2 or the another device, and restore the data before modulation. For example, the demodulation circuit 322 acquires a pulse sequence signal transmitted by the portable device 2 or the another in-vehicle communication device 12 based on the impulse signals input from the reception antenna 321. The pulse sequence signal acquired by the demodulation circuit 322 is a plurality of impulse signals input from the reception antenna 321 and arranged in time series at actual reception intervals. The demodulation circuit 322 includes a frequency conversion circuit that converts the frequency of the impulse signal received by the reception antenna 321 into the baseband and outputs a signal in the baseband, an amplification circuit that amplifies a signal level, and the like.

When the impulse signal is input from the reception antenna 321, the reception circuit 32 outputs a signal indicating reception of the impulse signal (hereinafter referred to as a reception notification signal) to the round trip timer 33.

The round trip timer 33 is a timer that measures the time from the transmission circuit 31 transmitting the impulse signal to the reception circuit 32 receiving the impulse signal (hereinafter referred to as a round trip time). The timing at which the transmission circuit 31 transmits the impulse signal is specified by the input of the transmission notification signal. The timing at which the receiving circuit 32 receives the impulse signal is specified by the input of the reception notification signal. That is, the round trip timer 33 of the present embodiment is configured to measure the time from when the modulation circuit 311 outputs the transmission notification signal to when the demodulation circuit 322 outputs the reception notification signal. The round trip time corresponds to a signal flight time.

The round trip timer 33 counts a clock signal input from a clock oscillator (not shown) to measure an elapsed time from the transmission circuit 31 transmitting the impulse signal. The count by the round trip timer 33 is stopped when the reception notification signal is input or when a count value reaches a predetermined upper limit value, and the count value is output to the authentication ECU 11. That is, the round trip time is reported to the authentication ECU 11. When the round trip time is reported to the authentication ECU 11, the count value of the round trip timer 33 returns to 0 (that is, is reset).

Figure 4:
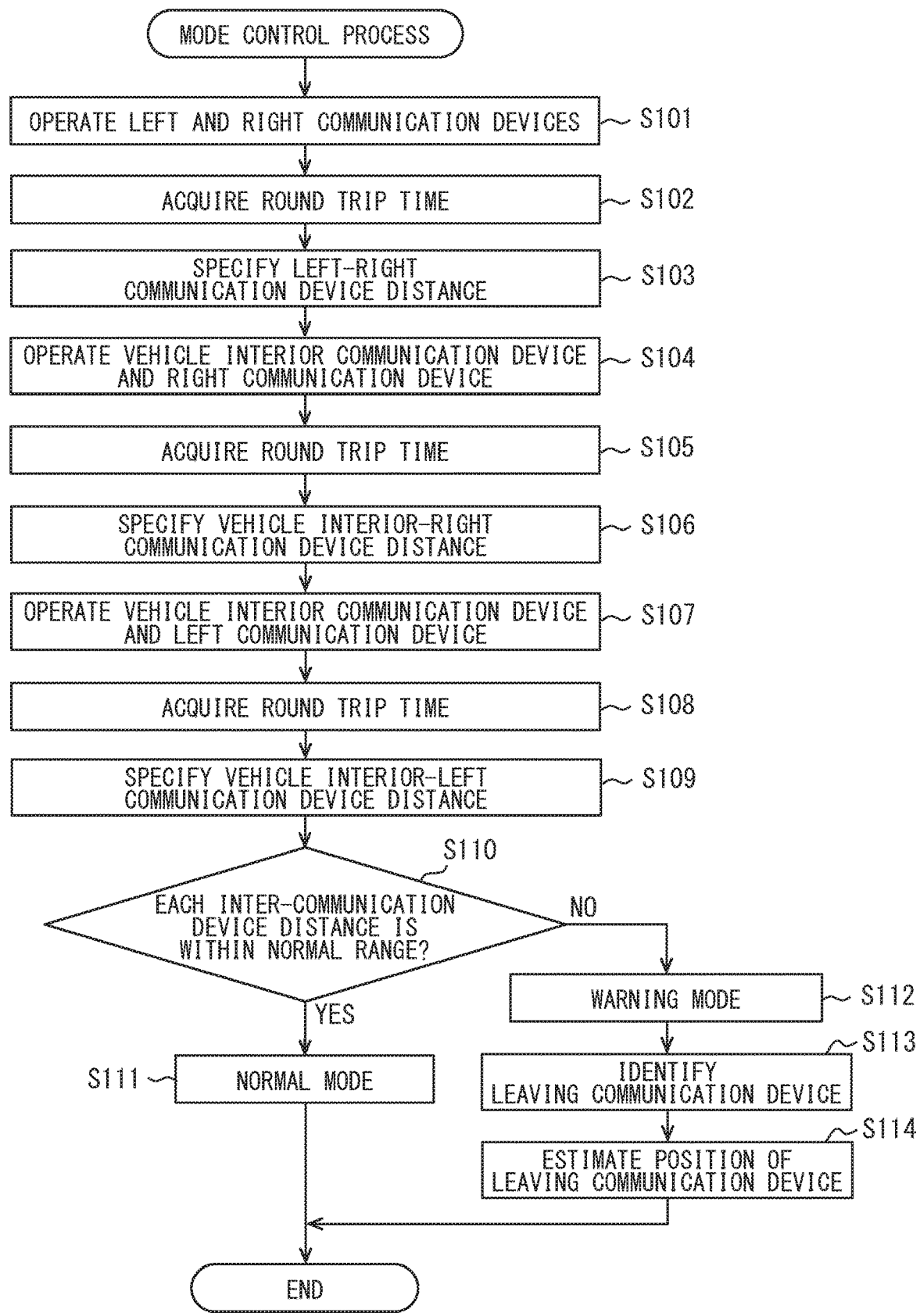
FIG. 4 is a flowchart for explaining a mode control process.

Next, the mode control process executed by the authentication ECU 11 will be described with reference to the flowchart shown in FIG. 4. The mode control process may be executed at a predetermined monitoring cycle while the vehicle information acquisition unit F1 determines that the vehicle Hv is parked. The power for the in-vehicle system 1 to execute the mode control process may be supplied from an in-vehicle battery (not shown). The monitoring cycle may be appropriately designed such as 500 milliseconds, 1 second, 5 seconds, or 1 minute.

Figures 5, 6:
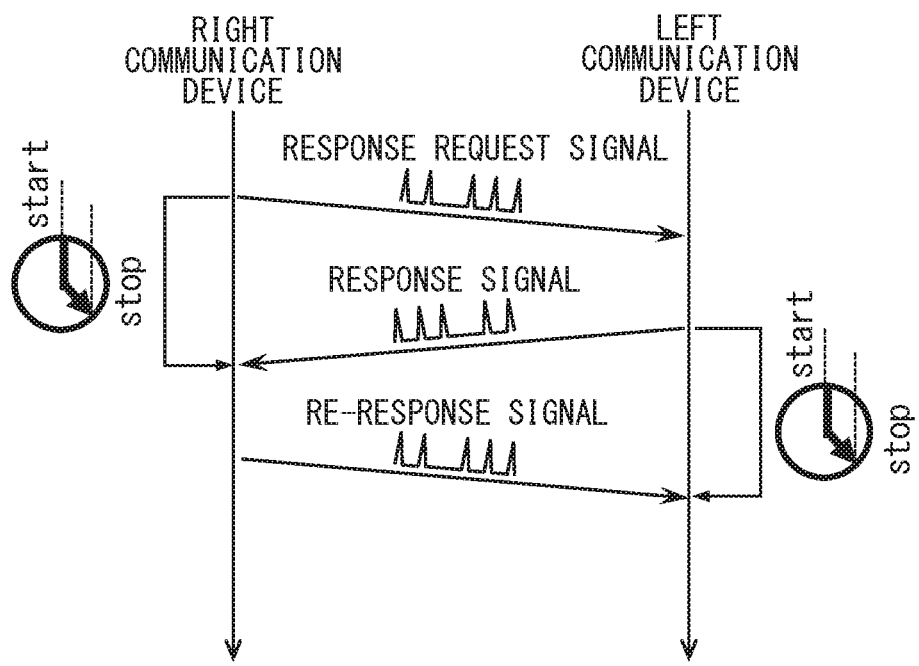
FIG. 5 is a diagram showing a communication mode between in-vehicle communication devices.
FIG. 6 is a conceptual diagram of data showing a normal range for respective combinations of the in-vehicle communication devices.

First, in S101, the communication processing unit F2 operates the right communication device 12A and the left communication device 12B to perform bidirectional wireless communication. Specifically, as shown in FIG. 5, the right communication device 12A is caused to transmit a pulse sequence signal that functions as a response request signal addressed to the left communication device 12B. In accordance with the transmission of the response request signal, the round trip timer 33 of the right communication device 12A starts measuring the elapsed time after transmitting the response request signal. That is, the measurement of the round trip time is started.

The response request signal is a signal requesting the return of the response signal. The response request signal includes, as destination information, for example, the communication device number of the in-vehicle communication device 12 that is the destination (here, the communication device number of the left communication device 12B). Since the response request signal includes the destination information, it is possible to restrict the in-vehicle communication device 12 other than the destination or the portable device 2 from returning the response signal. Further, the response request signal includes, as transmission source information, the communication device number of the in-vehicle communication device 12 of the transmission source (here, the communication device number of the right communication device 12A). Since the response request signal includes the transmission source information, the in-vehicle communication device 12 that has received the response request signal can specify a destination of the response signal (in other words, a reply destination).

Upon receiving the response request signal, the left communication device 12B transmits a pulse sequence signal that functions as a response signal. That is, the response signal in which the source information indicated in the response request signal is designated as the destination is transmitted. The response signal also includes destination information and transmission source information. Further, the round trip timer 33 in the left communication device 12B starts measuring the elapsed time (that is, the round trip time) after transmitting the impulse signal using the transmission of the response signal as a trigger.

Upon receiving the response signal from the left communication device 12B, the round trip timer 33 in the right communication device 12A stops measuring the round trip time and reports the measured round trip time to the authentication ECU 11. Further, upon receiving the response signal from the left communication device 12B, the right communication device 12A transmits a re-response signal which is a response signal to the response signal. The re-response signal is a pulse sequence signal that functions as a response signal. The re-reply signal also includes the source information and the destination information. It should be noted that the response request signal, the response signal, and the re-response signal do not have to include the destination information and the transmission source information, as will be described later in Modification 1 separately. Each of the response request signal, the response signal, and the re-response signal may be a single impulse signal.

Upon receiving the re-response signal from the right communication device 12A, the round trip timer 33 in the left communication device 12B stops measuring the round trip time and reports the measured round trip time to the authentication ECU 11. The round trip time measured by each of the right communication device 12A and the left communication device 12B as described above functions as an index (hereinafter referred to as distance index information) indicating the distance between the right communication device 12A and the left communication device 12B.

In S102, the inter-communication device distance specifying unit F5 acquires the round trip time from each of the right communication device 12A and the left communication device 12B, and the process proceeds to S103. In S103, the inter-communication device distance specifying unit F5 calculates a left-right communication device distance, which is the distance between the right communication device 12A and the left communication device 12B based on the round trip time acquired in S102.

For example, the inter-communication device distance specifying unit F5 subtracts the expected value of the response processing time in the left communication device 12B from the round trip time acquired from the right communication device 12A, and further divides the calculated value by 2 to calculate a one-way flight time. Then, the inter-communication device distance specifying unit F5 multiplies the one-way flight time by a propagation speed of the radio wave in the air to calculate the left-right communication device distance based on the round trip time acquired from the right communication device 12A. In addition, the inter-communication device distance specifying unit F5 calculates the left-right communication device distance based on the round trip time acquired from the left communication device 12B by the same procedure.

Then, the average value of the left-right communication device distance based on the round trip time acquired from the right communication device 12A and the left-right communication device distance based on the round trip time acquired from the left communication device 12B is adopted as the final left-right communication device distance. The expected values of the response processing times in the in-vehicle communication devices 12, the expected value of the response processing time in the portable device 2, and the propagation speed of the radio wave are assumed to be registered in the flash memory 111 as parameters for calculation.

The method for calculating the left-right communication device distance can be changed as appropriate. For example, as another aspect, the left-right communication device distance based on the round trip time acquired from the right communication device 12A may be directly adopted as the final left-right communication device distance. In that case, the left communication device 12B does not need to measure the round trip time, and the right communication device 12A does not need to transmit the re-response signal.

When the process in S103 is completed, the process proceeds to S104. In S104, the communication processing unit F2 operates the vehicle interior communication device 12X and the right communication device 12A to perform bidirectional wireless communication. The communication contents between the vehicle interior communication device 12X and the right communication device 12A are the same as in S101. The response request signal may be transmitted from the vehicle interior communication device 12X or the right communication device 12A. Here, as an example, the communication processing unit F2 controls the vehicle interior communication device 12X to transmit the response request signal toward the right communication device 12A. By executing S104, the round trip time indicating the distance between the vehicle interior communication device 12X and the right communication device 12A is measured in each of the vehicle interior communication device 12X and the right communication device 12A.

In S105, the inter-communication device distance specifying unit F5 acquires the round trip time from each of the vehicle interior communication device 12X and the right communication device 12A, and the process proceeds to S106. In S106, the inter-communication device distance specifying unit F5 calculates a vehicle interior-right communication device distance, which is the distance between the vehicle interior communication device 12X and the right communication device 12A, based on the round trip times acquired in S104. The calculation method can be the same as the method for calculating the left-right communication device distance. That is, a provisional vehicle interior-right communication device distance is calculated based on the round trip time acquired from the vehicle interior communication device 12X. Further, a provisional vehicle interior-right communication device distance is calculated based on the round trip time acquired from the right communication device 12A. Then, the average value of the vehicle interior-right communication device distance based on the round trip time acquired from the vehicle interior communication device 12X and the vehicle interior-right communication device distance based on the round trip time acquired from the right communication device 12A is adopted as the final vehicle interior-right communication device distance.

When the process in S106 is completed, the process proceeds to S107. In S107, the communication processing unit F2 operates the vehicle interior communication device 12X and the left communication device 12B to perform bidirectional wireless communication. The communication contents between the vehicle interior communication device 12X and the left communication device 12B are the same as S101 and S104. The response request signal may be transmitted from the vehicle interior communication device 12X or the left communication device 12B. Here, as an example, the communication processing unit F2 controls the vehicle interior communication device 12X to transmit the response request signal toward the left communication device 12B. By executing S107, the round trip time indicating the distance between the vehicle interior communication device 12X and the left communication device 12B is measured in each of the vehicle interior communication device 12X and the left communication device 12B.

In S108, the inter-communication device distance specifying unit F5 acquires the round trip time from each of the vehicle interior communication device 12X and the left communication device 12B, and the process proceeds to S109. In S109, the inter-communication device distance specifying unit F5 calculates a vehicle interior-left communication device distance, which is the distance between the vehicle interior communication device 12X and the left communication device 12B, based on the round trip times acquired in S108. The calculation method can be the same as the above-described method for calculating the left-right communication device distance. That is, a provisional vehicle interior-left communication device distance is calculated based on the round trip time acquired from the vehicle interior communication device 12X. Further, a provisional vehicle interior-left communication device distance is calculated based on the round trip time acquired from the left communication device 12B. Then, the average value of the vehicle interior-left communication device distance based on the round trip time acquired from the vehicle interior communication device 12X and the vehicle interior-left communication device distance based on the round trip time acquired from the left communication device 12B is adopted as the final vehicle interior-left communication device distance. Hereinafter, for the sake of convenience, the distance between two in-vehicle communication devices 12 arranged at different positions, such as the left-right communication device distance, the vehicle interior-right communication device distance, and the vehicle interior-left communication device distance, will be also referred to as an inter-communication device distance.

When the process of S109 is completed, the leaving device identifying unit F6 executes S110. In S110, the leaving device identifying unit F6 determines whether each of the various inter-communication device distances calculated in the above processes is within a normal range set in advance for respective combinations of the in-vehicle communication devices 12. Data indicating the normal range for the respective combinations of the in-vehicle communication devices 12 (hereinafter referred to as a normal range data) is stored in the flash memory 111 as a part of the control execution unit program, for example. FIG. 6 is a conceptual diagram showing the configuration of the normal range data. The normal range according to the respective combinations of the in-vehicle communication devices 12 may be set to a value obtained by adding a distance measurement error to the distance between the in-vehicle communication devices 12 determined based on the installation position of each of the in-vehicle communication devices 12.

The upper limit value of the normal range corresponds to a threshold value for the authentication ECU 11 to determine that the in-vehicle communication device 12 is removed from the vehicle Hv and relaying is performed at the baseband level. The state in which relaying is performed at the baseband level corresponds to a state in which the baseband signal from the authentication ECU 11 to the in-vehicle communication device 12 and the baseband signal from the in-vehicle communication device 12 to the authentication ECU 11 are relayed. When the relaying is performed at the baseband level, it is assumed that the inter-communication device distance calculated by the above method is 10 m or more. Therefore, the upper limit value of the normal range may be a value larger than the size of the vehicle Hv, such as 5 m or 10 m. The lower limit value of the normal range may be set appropriately, and may be 0 m, for example. The normal range may be defined only by the upper limit value.

As a result of the determination in S110, if there is an inter-communication device distance that deviates from the normal range according to the combination of the in-vehicle communication devices 12 among the plurality of inter-communication device distances, S112 is executed. On the other hand, if all the plurality of inter-communication device distances are within the normal ranges according to the combination of the in-vehicle communication devices 12, S111 is executed.

In S111, the mode control unit F7 sets the operation mode of the authentication ECU 11 to the normal mode and this flow ends. In S112, the mode control unit F7 sets the operation mode of the authentication ECU 11 to the warning mode, and the process proceeds to S113. In S113, the leaving device identifying unit F6 identifies the in-vehicle communication device removed from the vehicle body (hereinafter referred to as a vehicle leaving device) based on the combination of the in-vehicle communication devices 12 in which the inter-communication device distance has a value outside the normal range (in other words, an improper value).

Figure 7:
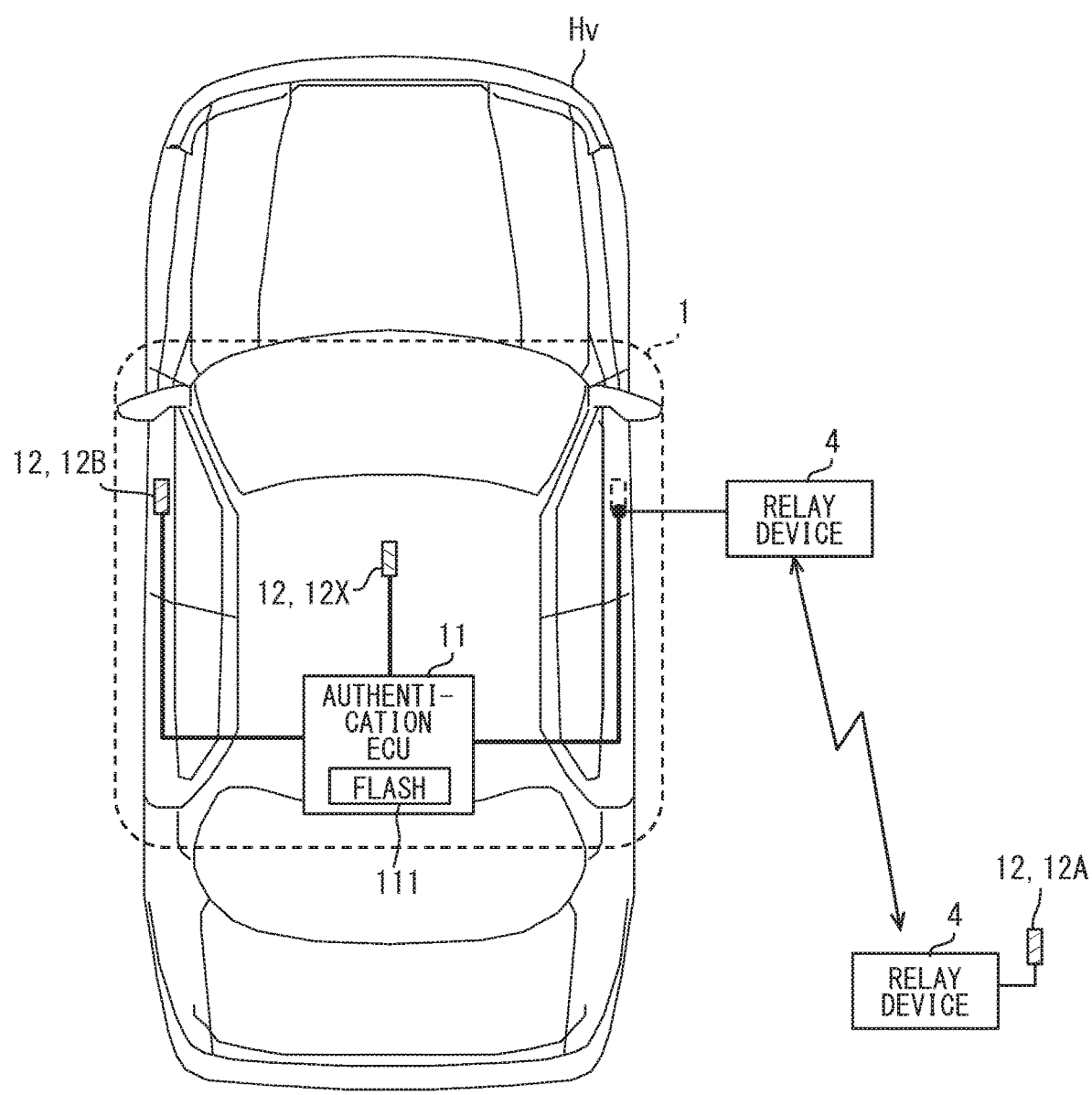
FIG. 7 is a diagram showing a mode in which a right communication device is removed from a vehicle body and a relaying is performed at a baseband level.

For example, as shown in FIG. 7, when the right communication device 12A is removed from the vehicle body and relay devices 4 are performing relay at the baseband level, the left-right communication device distance and the vehicle interior-right communication device distance are improper. Therefore, if the left-right communication device distance and the vehicle interior-right communication device distance are improper, it can be determined that the right communication device 12A is removed from the vehicle Hv. That is, the vehicle leaving device can be identified as the right communication device 12A. Based on the same technical idea, when the left-right communication device distance and the vehicle interior-left communication device distance are improper, the vehicle leaving device can be identified as the left communication device 12B.

When the process in S113 is completed, the leaving device identifying unit F6 executes S114. In S114, the leaving device identifying unit F6 identifies the position of the vehicle leaving device based on the distance between at least two inter-communication device distances related to the vehicle leaving device and the installation positions of the in-vehicle communication devices 12 other than the vehicle leaving device. The inter-communication device distances related to the vehicle leaving device are the inter-communication device distances for the combinations of the in-vehicle communication devices including the vehicle leaving device. For example, when the vehicle leaving device is the right communication device 12A, the left-right communication device distance and the vehicle interior-right communication device distance correspond to the inter-communication device distances related to the vehicle leaving device. When the vehicle leaving device is the left communication device 12B, the left-right communication device distance and the vehicle interior-left communication device distance correspond to the inter-communication device distances related to the vehicle leaving device.

When the vehicle leaving device is the right communication device 12A, the leaving device identifying unit F6 estimates (for example, calculates) the position of the right communication device 12A as the vehicle leaving device based on the left-right communication device distance, the vehicle interior-right communication device distance, the installation position of the left communication device 12B, and the installation position of the vehicle interior communication device 12X. Specifically, the leaving device identifying unit F6 determines that the right communication device 12A is present at a point where a distance from the left communication device 12B is the left-right communication device distance and a distance from the vehicle interior communication device 12X is the vehicle interior-right communication device distance. There are two points that satisfy the above conditions. The leaving device identifying unit F6 may determine that the vehicle leaving device is present at either of the two points.

Also wen the vehicle leaving device is the left communication device 12B, the leaving device identifying unit F6 specifies the position of the left communication device 12B as the vehicle leaving device by the same method. That is, the leaving device identifying unit F6 specifies the position of the left communication device 12B as the vehicle leaving device based on the left-right communication device distance, the vehicle interior-left communication device distance, the installation position of the right communication device 12A, and the installation position of the vehicle interior communication device 12X.

When the in-vehicle system 1 includes four or more in-vehicle communication devices 12 and there is one vehicle leaving device, the number of in-vehicle communication devices other than the vehicle leaving device (hereinafter referred to as remaining devices) is three. That is, there are three or more reference points that can be used to calculate the position of the vehicle leaving device. When there are at least three reference points that can be used to calculate the position of the vehicle leaving device, the position of the vehicle leaving device can be specified as one point.

When the above process is completed, this flow ends. It should be noted that the in-vehicle communication device 12 corresponding to the vehicle leaving device identified by the leaving device identification unit F6 and the position information of the vehicle leaving device may be held in the memory until the operation mode is set to the normal mode.

The authentication ECU 11 may be configured to notify the user of the in-vehicle communication device 12 corresponding to the vehicle leaving device identified by the leaving device identifying unit F6 and the position information of the vehicle leaving device via the display mounted on the vehicle Hv or the portable device 2. With such a configuration, security can be further enhanced.

Figure 8:
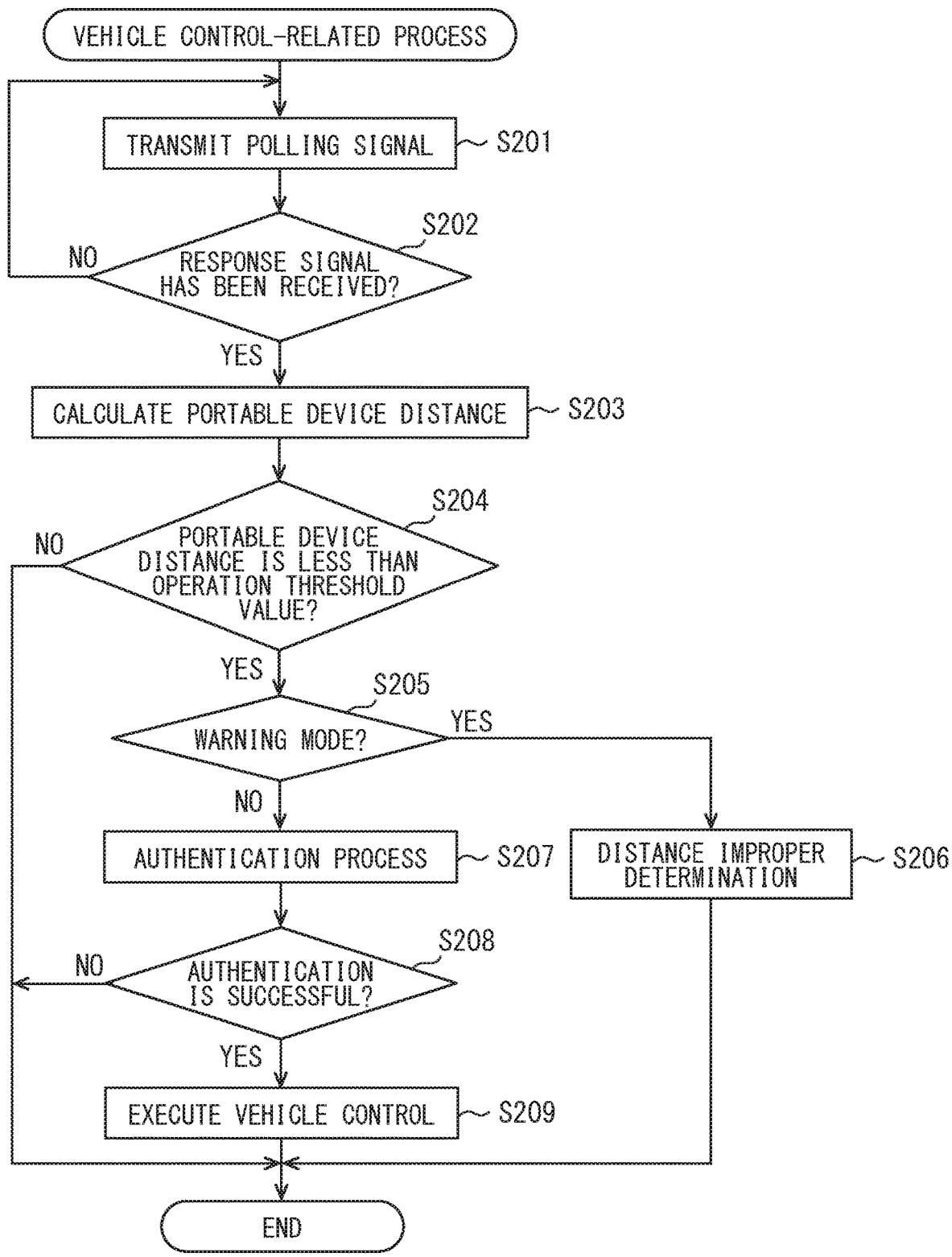
FIG. 8 is a flowchart for explaining a vehicle control-related process.

Next, the vehicle control-related process performed by the authentication ECU 11 will be described using the flowchart shown in FIG. 8. The vehicle control-related process is a process for the authentication ECU 11 to perform vehicle control for the user to use the vehicle Hv based on the result of wireless communication with the portable device 2. The vehicle control-related process is executed, for example, at a timing when a predetermined time (for example, 10 seconds) has elapsed from the time when the vehicle Hv entered the parking state. Further, the vehicle control-related process may be sequentially executed while the vehicle information acquisition unit F1 determines that the vehicle Hv is parked, for example.

First, in S201, the communication processing unit F2 causes a predetermined in-vehicle communication device 12 (for example, the vehicle interior communication device 12X) to transmit a polling signal, and the process proceeds to S202. The polling signal is a wireless signal that does not include a challenge code requesting the portable device 2 to return a response signal. Since the polling signal may play a role of returning the portable device 2 from a sleep mode to a normal mode, the polling signal may be referred to as a wake signal. When the in-vehicle communication device 12 receives the response signal to the polling signal from the portable device 2, the authentication ECU 11 as the authentication processing unit F3 can detect that the communication terminal that may be the portable device 2 is within the communication area of the vehicle Hv.

It is assumed that the polling signal also includes the transmission source information and the destination information. The round trip timer 33 of the in-vehicle communication device 12 that is the transmission source of the polling signal (hereinafter referred to as an operating communication device) starts measuring the elapsed time from the transmission of the polling signal. That is, the measurement of the round trip time is started.

In S202, it is determined whether the operating communication device has received the response signal to the polling signal transmitted in S201. When the operating communication device has receive the response signal, the affirmative determination is made in S202 and the process proceeds to S203. When the response signal from the portable device 2 has been received, the round trip timer 33 of the operating communication device stops measuring the round trip time and reports the measured round trip time to the authentication ECU 11. This round trip time functions as information indicating the distance from the operating communication device to the portable device 2 (hereinafter referred to as portable device distance-related information).

On the other hand, if the response signal has not been received even after a predetermined response waiting time has elapsed since the execution of S201, the process returns to S201, and the in-vehicle communication device 12 (for example, the right communication device 12A) different from the in-vehicle communication device 12 that previously transmitted the response request signal transmits a polling signal. That is, S201 to S202 are processes for transmitting polling signals in order from the plurality of in-vehicle communication devices 12. The order in which the polling signals are transmitted by the plurality of in-vehicle communication devices 12 may be appropriately designed.

In S203, the portable device distance specifying unit F4 calculates a portable device distance, which is a distance from the operating communication device to the portable device 2, based on the round trip time reported from the operating communication device, and the process proceeds to S204. The calculation method of the portable device distance based on the round trip time can be implemented by the same method as the calculation of the inter-communication device distance.

In S204, the authentication processing unit F3 determines whether the portable device distance calculated in S203 is less than a predetermined operation threshold value. The operation threshold value corresponds to an upper limit value of the communication device distance that permits execution of vehicle control. The operation threshold value is set to a value indicating that the portable device 2 is present near the vehicle Hv or in the vehicle interior, such as 1 m or 2 m. The operation threshold may be set to 5 m. When the portable device distance is less than the operation threshold value, the process proceeds to S205.

On the other hand, when the portable device distance is equal to or greater than the operation threshold value, a negative determination is made in S204, and this flow ends. It should be noted that vehicle control is not executed when the portable device distance is equal to or greater than the operation threshold value. When the portable device distance is equal to or greater than the operation threshold value, the vehicle control-related process may be executed again from S201.

In S205, the authentication processing unit F3 determines whether the operation mode of the authentication ECU 11 is set to the warning mode by the mode control unit F7. When the operation mode of the authentication ECU 11 is set to the warning mode, S206 is executed. On the other hand, when the operation mode of the authentication ECU 11 is set to the normal mode, S207 is executed.

In S206, the authentication processing unit F3 determines that the portable device distance calculated in S203 is an improper value, and ends this flow. As described above, the authentication ECU 11 of the present embodiment does not execute the vehicle control for the user to use the vehicle Hv when it determining that the portable device distance is improper. When it is determined that the portable device distance is improper, the vehicle control-related process may be executed again from S201.

Note that the case where the mode control unit F7 sets the operation mode of the authentication ECU 11 to the warning mode is a case where at least one of the inter-communication device distances for the respective combinations of the in-vehicle communication devices 12 deviates from the predetermined normal range according to the respective combinations of the in-vehicle communication devices 12. In other words, the above-described configuration corresponds to a configuration that does not execute the vehicle control when at least one of the inter-communication device distances for the respective combinations of the in-vehicle communication devices deviates from the predetermined normal range according to the respective combinations of the in-vehicle communication devices 12.

In S207, the authentication processing unit F3 cooperates with the communication processing unit F2 to execute the authentication process of the portable device 2. Specifically, the authentication processing unit F3 requests the communication processing unit F2 to transmit a signal including a challenge code (hereinafter referred to as a challenge signal) from the operating communication device. The communication processing unit F2 causes the operating communication device to transmit the challenge signal based on the request from the authentication processing unit F3.

The challenge code is a code for authenticating the portable device 2. The challenge code may be a random number generated with the use of a random number table or the like. Upon receiving the challenge code, the portable device 2 encrypts the challenge code with an encryption key registered in advance in the portable device 2 and returns a signal (hereinafter referred to as a response signal) including the encrypted code (hereinafter referred to as a response code). In addition to transmit the challenge signal, the authentication processing unit G3 generates a code (hereinafter referred to as a verification code) obtained by encrypting the challenge code using the encryption key held by the authentication processing unit G3.

When the transmission of the challenge signal and the generation of the verification code in S207 are completed, the process proceeds to S208. In S208, it is determined whether the authentication process is successful. For example, when the response signal can be received from the portable device 2 and the response code indicated by the response signal matches the verification code, it is determined that the authentication is successful. On the other hand, when the response code cannot be received even after the response waiting time has elapsed since the challenge signal was transmitted, it is determined that the authentication has failed. Even when the response code can be received, if the response code indicated by the response signal does not match the verification code, it is determined that the authentication has failed.

When the authentication process is successful, the affirmative decision is made in S208 and the process proceeds to S209. On the other hand, if the authentication process fails, a negative determination is made in S208 and this flow ends. Also when the authentication process has failed, the vehicle control for the user to use the vehicle Hv is not executed. When the authentication process has failed, the vehicle control-related process may be executed again from S201.

In S209, the control execution unit F8 executes the predetermined vehicle control for the user to use the vehicle Hv according to the scene (in other words, the state of the vehicle Hv) when the authentication process is successful. For example, when the vehicle Hv is parked, the control execution unit F8 cooperates with a body ECU (not shown) to set a door lock mechanism of the vehicle Hv to an unlocked state or an unlock preparation state. The unlock preparation state is a state in which the user can unlock the door simply by touching a button or a touch sensor arranged on the door. In addition, the control execution unit F8 starts the engine in cooperation with the engine ECU when the portable device 2 is present in the vehicle compartment. In addition, the content of the vehicle control performed by the control execution unit F8 is appropriately determined according to the scene (in other words, the state of the vehicle Hv) when the authentication process is successful.

In the above configuration, the authentication ECU 11 performs bidirectional wireless communication for each combination of in-vehicle communication devices 12 in a positional relationship capable of performing wireless communication with each other, and determines whether the inter-communication device distance is the normal value based on the round trip time obtained as a result of the communication. Then, when the inter-communication device distance deviating from the normal range according to the combination of the in-vehicle communication devices 12 is present among the plurality of inter-communication device distances, execution of the vehicle control such as unlocking of the vehicle door is prohibited (or put on hold).

With such a configuration, even when the in-vehicle communication device 12 disposed on the outer surface portion of the vehicle Hv is removed from the vehicle Hv together with the module and relay is performed at the baseband signal level, illegal use of the vehicle Hv can be restricted.

In the above-described embodiment, the configuration is disclosed in which the vehicle control is prohibited by considering the portable device distance specified by the portable device distance specifying unit F4 as an improper value. The configuration in which the vehicle control is not executed when there is the inter-communication device distance that deviates from the normal range according to the combination of the in-vehicle communication devices 12 among the plurality of inter-communication device distances is not limited to the above configuration. For example, there may be a configuration in which the authentication process is not executed when there is the inter-communication device distance that deviates from the normal range depending on the combination of the in-vehicle communication devices 12 among the plurality of inter-communication device distances. If the authentication process is not executed, the authentication will not be successful. Therefore, even with the above configuration, execution of vehicle control can be prohibited.

Alternatively, there may be a configuration in which the transmission of the signal, such as the polling signal or the like, directed to the portable device 2 is stopped when there is the inter-communication device distance that deviates from the normal range depending on the combination of the in-vehicle communication devices 12 among the plurality of inter-communication device distances. Also with the above configuration, execution of vehicle control can be prohibited.

While the embodiments of the present disclosure have been described above, the present disclosure is not limited to the embodiments described above, and various modifications to be described below are included in the technical scope of the present disclosure, and may be implemented by various modifications within a scope not departing from the spirit described below. For example, various modifications to be described below can be implemented in combination as appropriate within a scope that does not cause technical inconsistency.

Note that members having the same functions as those described in the above embodiment are denoted by the same reference numerals, and a description of the same members will be omitted. When only a part of the configuration is referred to, the configuration of the embodiment described above can be applied to other parts.

First Modification

In the above-described embodiment, an aspect has been disclosed in which when the inter-communication device distance is specified, the two in-vehicle communication devices 12 as distance measurement objects exchange the signals including the transmission source information and the destination information. However, the present disclosure is not limited to this aspect. The in-vehicle communication device 12 may be configured to measure the round trip time by transmitting and receiving single-shot impulse signals.

The in-vehicle communication device 12 of the present modified example transmits a single impulse signal as a response request signal based on an instruction from the authentication ECU 11. Further, when the two in-vehicle communication devices 12 that provide the combination as the distance measurement objects receive the single impulse signal, the two in-vehicle communication devices 12 return single-shot impulse signals as a response signal or a re-response signal. The authentication ECU 11 in the present modification controls the in-vehicle communication device 12 other than the combination as the distance measurement objects so that the operation is stopped or the single-shot impulse signal as the response signal is not returned even if the single-shot impulse signal is received. For example, while the process for measuring the distance between the left and right communication devices is being performed in S101 to S103, the operation of the vehicle interior communication device 12X is stopped. The state in which the in-vehicle communication device 12 stops operating is a state in which no signal is transmitted or received. The portable device 2 of the present modification is also configured not to return the single-shot impulse signal as the response signal even when receiving the single-shot impulse signal.

According to the configuration in which the round trip time is measured by transmitting and receiving the single-shot impulse signals in this way, the time required for arithmetic process for generating the response signal (that is, the response processing time) is less likely to be included in the round trip time. As a result, the accuracy of distance measurement between the communication devices can be improved.

Second Modification

In the above-described embodiment, an aspect has been disclosed in which the inter-communication device distance is calculated using the round trip time. However, the index for calculating the inter-communication device distance is not limited to the round trip time. Each in-vehicle communication device 12 may report the reception intensity of the signal transmitted from the other device to the authentication ECU 11 as distance index information, and the inter-communication device distance specifying unit F5 may calculate the inter-communication device distance based on the reception intensity detected by each in-vehicle communication device 12.

Further, when each in-vehicle communication device 12 is completely synchronized under the control of the authentication ECU 11, each in-vehicle communication device 12 may be configured to generate one-way flight time as distance index information. The one-way flight time is the difference between the time when a signal is transmitted from the other device and the time when the signal is actually received. The one-way flight time can be calculated by predefining the time when each in-vehicle communication device 12 transmits a signal. In addition, various methods can be applied as a method of calculating the distance between communication devices.

Third Modification

In the above-described embodiment, an aspect has been disclosed in which each in-vehicle communication device 12 reports the round trip time to the authentication ECU 11, and the authentication ECU 11 calculates the inter-communication device distance based on the round trip time provided from each in-vehicle communication device 12. However, the present disclosure is not limited to this aspect. Each in-vehicle communication device 12 may have a function of calculating the inter-communication device distance based on the round trip time. That is, each in-vehicle communication device 12 calculates the distance from the own device to the other device as a communication partner based on the round trip time measured when wirelessly communicating with the other device. Then, the data indicating the distance is reported to the authentication ECU 11 in association with the communication device numbers of the communication partner and the own device.

Such a configuration also achieves the same effects as those of the embodiment described above. Moreover, the calculation load of the authentication ECU 11 can be suppressed. The technical idea disclosed as the third modification can be applied to the configuration for calculating the distance based on the reception intensity and the like disclosed in the second modification. For example, each in-vehicle communication device 12 may be configured to calculate the distance based on the reception intensity of a signal received from the another device.

The data indicating the round trip time and the data indicating the reception intensity generated by the in-vehicle communication device 12 correspond to the distance-related information indirectly indicating the distance to the another device. When the in-vehicle communication device 12 calculates the distance to the another device, the data indicating the distance corresponds to the distance-related information that directly indicates the distance to the another device.

Fourth Modification

In the above-described embodiment, an aspect has been disclosed in which the vehicle interior communication device 12X is provided. However, the present disclosure is not limited to this aspect. The vehicle interior communication device 12X may not be provided. In other words, all of the in-vehicle communication device 12 may be arranged on the outer surface portion of the vehicle Hv. For example, in the in-vehicle system 1, as shown in FIG. 9, the in-vehicle communication devices 12 may be arranged at the four corners of the vehicle Hv.

Figure 9:
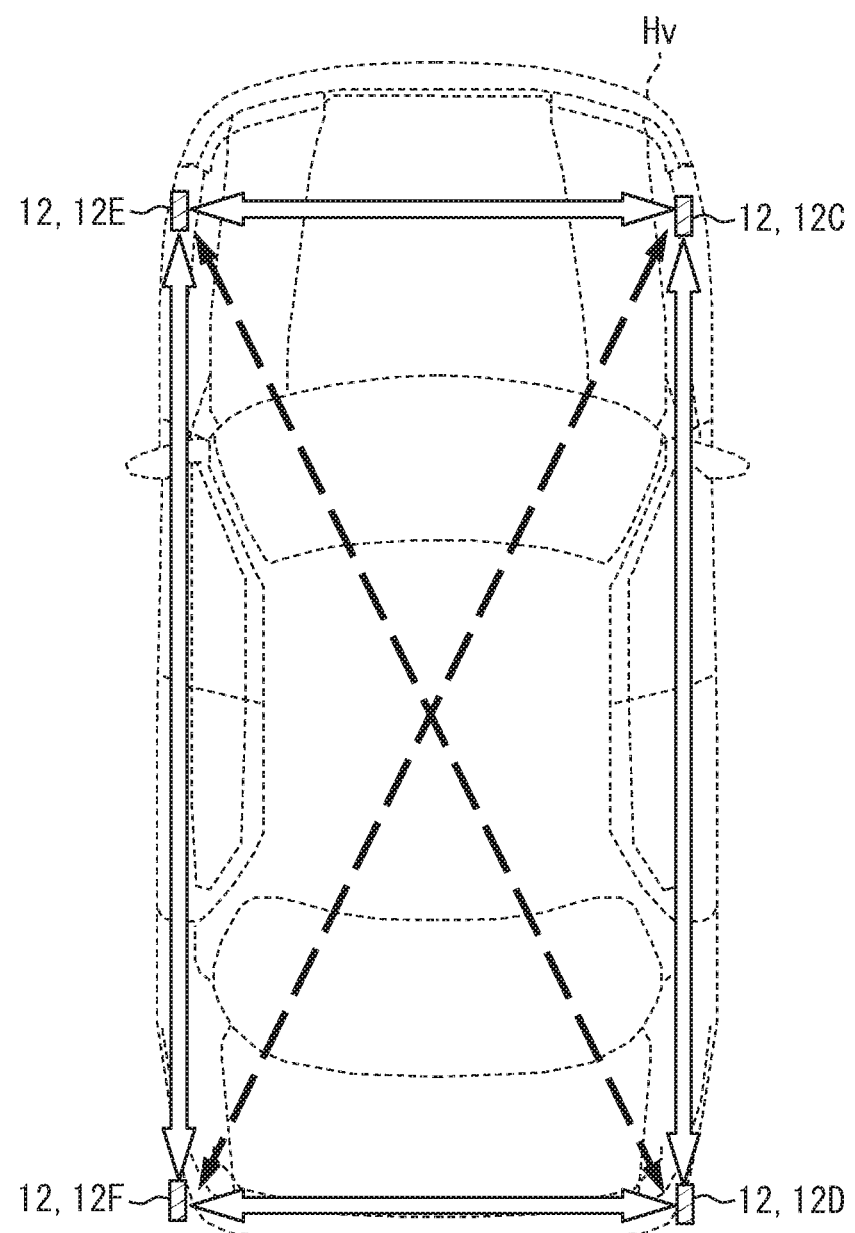
FIG. 9 is a diagram illustrating a modification of an installation mode of in-vehicle communication devices.

An in-vehicle communication device 12C shown in FIG. 9 is the in-vehicle communication device 12 arranged at the right corner portion of the front end of the vehicle. An in-vehicle communication device 12D is the in-vehicle communication device 12 arranged at the right corner portion at the rear end of the vehicle. An in-vehicle communication device 12E is the in-vehicle communication device 12 arranged at the left corner portion at the front end of the vehicle. An in-vehicle communication device 12F is the in-vehicle communication device 12 arranged at the left corner portion at the rear end of the vehicle. The authentication ECU 11 is not shown in FIG. 9.

In addition, white arrows in FIG. 9 indicate combinations of the in-vehicle communication devices 12 configured to be capable of wireless communication with each other. As shown in FIG. 9, the in-vehicle communication device 12 located diagonally may or may not be configured to perform wireless communication. Each in-vehicle communication device 12 may be configured to be capable of wireless communication with at least another device. The combinations of the in-vehicle communication devices 12 for which the inter-communication device distance are calculated may be appropriately designed. Of course, each of the in-vehicle communication devices 12C to 12F may be configured to be capable of wireless communication with another device present in diagonal position as indicated by broken line arrows.

Fifth Modification

In the above-described embodiment, a configuration has been disclosed in which the in-vehicle system 1 and the portable device 2 are configured to perform wireless communication by the Impulse Radio method. However, the present disclosure is not limited to this configuration. The in-vehicle system 1 and the portable device 2 may also be configured to perform wireless communication by a Multi-Band Orthogonal Frequency Division Multiplexing (MB-OFDM) system, a Direct Sequence UWB (DS-UWB) system, or the like. The in-vehicle system 1 and the portable device 2 may also be configured to perform wireless communication in conformity with short-range wireless communication standards (hereinafter referred to as a short-range communication) such as Bluetooth (registered trademark), Wi-Fi (registered trademark), and ZigBee (registered trademark). The in-vehicle system 1 and the portable device 2 may also be configured to perform wireless communication using radio waves in the LF band and radio waves in the UHF band.

The units or functions provided by the authentication ECU 11 may be provided by software stored in a tangible memory device and a computer executing the software, only software, only hardware, or a combination of the software and the hardware. For example, when the authentication ECU 11 is provided by an electronic circuit being hardware, it may be possible to provide by a digital circuit including multiple logic circuits or analog circuits. The authentication ECU 11 may also be provided by one computer or a pair of computer resources configured to be capable of mutual communication.

The portable device 2 may be a device that is carried by a user and has a function as an electronic key of the vehicle Hv. The function as the electronic key of the vehicle Hv is, specifically, a function of transmitting a signal (for example, a response signal) including information proving that it is the key of the vehicle Hv based on a request from the in-vehicle system 1. The portable device 2 may be a rectangular, elliptical (fob type), or card type small device conventionally known as a smart key. The portable device 2 may be configured as a wearable device worn on a finger, arm, or the like of a user. Furthermore, the portable device 2 may be an information processing terminal such as a smartphone or a tablet terminal.

What is claimed is:

1. A vehicle electronic key system configured to execute an authentication process by wireless communication with a portable device carried by a user of a vehicle and to execute a predetermined vehicle control based on a success of the authentication process, the vehicle electronic key system comprising:

a plurality of in-vehicle communication devices configured to be disposed on different positions of the vehicle as communication devices that perform wireless communication with the portable device; and
an authentication device configured to be communicably connected to each of the plurality of in-vehicle communication devices, wherein
at least one of the plurality of in-vehicle communication devices is configured to be disposed on an outer surface of the vehicle,
each of the plurality of in-vehicle communication devices is configured to:
　perform wireless communication with at least another in-vehicle communication device among the plurality of in-vehicle communication devices;
　generate, based on a signal transmitted from the another in-vehicle communication device, distance-related information that directly or indirectly indicates a distance to the another in-vehicle communication device; and
　generate, based on a signal transmitted from the portable device, portable device distance-related information that directly or indirectly indicates a distance to the portable device,
the authentication device includes:
　a control execution unit configured to execute the vehicle control based on the success of the authentication process;
　a portable device distance specifying unit configured to specify the distance to the portable device based on the portable device distance-related information generated by the in-vehicle communication devices;
　an authentication processing unit configured to cooperate with at least one of the plurality of in-vehicle communication devices to execute the authentication process of the portable device on condition that the distance to the portable device specified by the portable device distance specifying unit is equal to or less than a predetermined operation threshold value for permitting execution of the vehicle control; and
　an inter-communication device distance specifying unit configured to specify, based on the distance-related information respectively generated by the plurality of in-vehicle communication devices, a plurality of inter-communication device distances, which are distance between two in-vehicle communication devices, for respective combinations of the in-vehicle communication devices in a positional relationship capable of performing wireless communication with each other, and
the authentication processing unit is further configured not to execute the authentication process when at least one of the inter-communication device distances for the respective combinations of the in-vehicle communication devices deviates from a predetermined normal range according to the respective combinations of the in-vehicle communication devices even if the distance to the portable device specified by portable device distance specifying unit is equal to or less than the predetermined operation value.

2. The vehicle electronic key system according to claim 1, wherein the plurality of in-vehicle communication devices includes at least one vehicle interior communication device disposed at a position in a vehicle interior where the vehicle interior communication device is capable of performing wireless communication with the in-vehicle communication device disposed on the outer surface of the vehicle.

3. The vehicle electronic key system according to claim 1, wherein the number of the plurality of in-vehicle communication devices is three or more, the vehicle electronic key system further comprising a leaving device specifying unit configured to specify, among the plurality of in-vehicle communication devices, a vehicle leaving device that is the in-vehicle communication device removed from the vehicle based on the combination of the in-vehicle communication devices having the inter-communication device distance deviated from the normal range.

4. The vehicle electronic key system according to claim 3, wherein the leaving device specifying unit is further configured to estimate a position of the vehicle leaving device based on the inter-communication device distance of the combination of the in-vehicle communication devices related to the vehicle leaving device and an installation position of the in-vehicle communication device that is other than the vehicle leaving device and provides the combination.

5. The vehicle electronic key system according to claim 1, wherein each of the in-vehicle communication devices is configured to generate, as the distance-related information, a signal flight time determined based on a time from transmission of a radio signal to reception of a response signal with respect to the radio signal.

6. The vehicle electronic key system according to claim 5, wherein each of the in-vehicle communication devices is configured to calculate the signal flight time as the distance-related information by transmitting and receiving impulse signals, which are pulse signals having ultra-wide bandwidths, with the another in-vehicle communication device.

7. A vehicle electronic key system comprising:
   a plurality of in-vehicle communication devices configured to be disposed on different positions of a vehicle and to perform wireless communication with a portable device carried by a user of the vehicle; and
   an authentication device configured to be communicably connected to each of the plurality of in-vehicle communication devices, wherein
   at least one of the plurality of in-vehicle communication devices is configured to be disposed on an outer surface of the vehicle,
   each of the plurality of in-vehicle communication devices is configured to:
      perform wireless communication with at least another in-vehicle communication device among the plurality of in-vehicle communication devices;
      generate, based on a signal transmitted from the another in-vehicle communication device, distance-related information that directly or indirectly indicates a distance to the another in-vehicle communication device; and
      generate, based on a signal transmitted from the portable device, portable device distance-related information that directly or indirectly indicates a distance to the portable device,
   the authentication device includes a processor and a memory that stores instructions configured to, when executed by the processor, cause the processor to:
      execute an authentication process of the portable device;
      specify the distance to the portable device based on the portable device distance-related information generated by the in-vehicle communication devices;
      cooperate with at least one of the plurality of in-vehicle communication devices to execute the authentication process of the portable device on condition that the distance to the portable device is equal to or less than a predetermined operation threshold value for permitting execution of the vehicle control;
      specify, based on the distance-related information respectively generated by the plurality of in-vehicle communication devices, a plurality of inter-communication device distances, which are distance between two in-vehicle communication devices, for respective combinations of the in-vehicle communication devices in a positional relationship capable of performing wireless communication with each other;
      execute a predetermined vehicle control when all of the inter-communication device distances for the respective combinations of the in-vehicle communication devices are within predetermined normal ranges according to the respective combinations of the in-vehicle communication devices and the authentication process of the portable device is successful; and
      not execute the authentication process when at least one of the inter-communication device distances for the respective combinations of the in-vehicle communication devices deviates from the normal range even if the distance to the portable device is equal to or less than the predetermined operation threshold value.

8. A vehicle electronic key system configured to execute an authentication process by wireless communication with a portable device carried by a user of a vehicle and to execute a predetermined vehicle control based on a success of the authentication process, the vehicle electronic key system comprising:
   a plurality of in-vehicle communication devices configured to be disposed on different positions of the vehicle as communication devices that perform wireless communication with the portable device; and
   an authentication device configured to be communicably connected to each of the plurality of in-vehicle communication devices, wherein
   at least one of the plurality of in-vehicle communication devices is configured to be disposed on an outer surface of the vehicle,
   each of the plurality of in-vehicle communication devices is configured to perform wireless communication with at least another in-vehicle communication device among the plurality of in-vehicle communication devices and configured to generate, based on a signal transmitted from the another in-vehicle communication device, distance-related information that directly or indirectly indicates a distance to the another in-vehicle communication device,
   the authentication device includes:
      a control execution unit configured to execute the vehicle control based on the success of the authentication process; and
      an inter-communication device distance specifying unit configured to specify, based on the distance-related information respectively generated by the plurality of in-vehicle communication devices, a plurality of inter-communication device distances, which are distance between two in-vehicle communication devices, for respective combinations of the in-vehicle communication devices in a positional relationship capable of performing wireless communication with each other, and
   the control execution unit is further configured not to execute the vehicle control when at least one of the inter-communication device distances for the respective combinations of the in-vehicle communication devices deviates from a predetermined normal range according to the respective combinations of the in-vehicle communication devices;

wherein the number of the plurality of in-vehicle communication devices is three or more, the vehicle electronic key system further comprising a leaving device specifying unit configured to specify, among the plurality of in-vehicle communication devices, a vehicle leaving device that is the in-vehicle communication device removed from the vehicle based on the combination of the in-vehicle communication devices having the inter-communication device distance deviated from the normal range.

9. The vehicle electronic key system according to claim 8, wherein the leaving device specifying unit is further configured to estimate a position of the vehicle leaving device based on the inter-communication device distance of the combination of the in-vehicle communication devices related to the vehicle leaving device and an installation position of the in-vehicle communication device that is other than the vehicle leaving device and provides the combination.

* * * * *